United States Patent
Nagase et al.

(10) Patent No.: US 11,686,130 B2
(45) Date of Patent: Jun. 27, 2023

(54) SYSTEMS AND METHODS FOR OPERATING A POWER TAILGATE SYSTEM

(71) Applicant: Aisin Technical Center of America, Inc., Northville, MI (US)

(72) Inventors: Koji Nagase, Novi, MI (US); Daisuke Yamada, Ann Arbor, MI (US); Emiko Okuma, Novi, MI (US); Yasuo Imatomi, Miyoshi (JP)

(73) Assignee: Aisin Technical Center of America, Inc., Northville, MI (US)

( * ) Notice: Subject to any disclaimer, the term of this patent is extended or adjusted under 35 U.S.C. 154(b) by 703 days.

(21) Appl. No.: 16/717,200

(22) Filed: Dec. 17, 2019

(65) Prior Publication Data

US 2021/0180367 A1 Jun. 17, 2021

(51) Int. Cl.
*E05B 77/00* (2014.01)
*B62D 33/037* (2006.01)
*E05B 81/06* (2014.01)
*E05B 83/00* (2014.01)
*E05B 85/26* (2014.01)
*E05F 15/611* (2015.01)
*E05B 85/24* (2014.01)

(52) U.S. Cl.
CPC ............ *E05B 77/00* (2013.01); *B62D 33/037* (2013.01); *E05B 81/06* (2013.01); *E05B 83/00* (2013.01); *E05B 85/243* (2013.01); *E05B 85/26* (2013.01); *E05F 15/611* (2015.01); *E05Y 2400/40* (2013.01); *E05Y 2400/81* (2013.01); *E05Y 2900/546* (2013.01)

(58) Field of Classification Search
CPC ............ E05Y 2400/40; E05Y 2400/81; E05Y 2900/546; B62D 33/037; E05B 81/06; E05B 83/00; E05B 85/243; E05B 85/26; E05F 15/611
See application file for complete search history.

(56) References Cited

U.S. PATENT DOCUMENTS

| 4,667,991 | A | | 5/1987 | Pebre |
| 4,982,984 | A | | 1/1991 | Yokota et al. |
| 4,988,135 | A | | 1/1991 | Ottino |
| 5,448,856 | A | * | 9/1995 | Moore .................. E05F 15/611 49/340 |
| 5,829,198 | A | | 11/1998 | Watanabe |
| 6,175,202 | B1 | * | 1/2001 | Weyerstall .............. E05B 81/66 318/443 |

(Continued)

*Primary Examiner* — Mark A Williams
(74) *Attorney, Agent, or Firm* — Christopher G. Darrow; Darrow Mustafa PC

(57) ABSTRACT

Embodiments of systems and methods for operating a power tailgate system include overload checking a tailgate latched by a latch that is in a full-latching position, connected with a latch actuator, and activated by the latch actuator for non-revertible movement in a latching direction. Overload checking the tailgate includes operating the latch actuator to over-stroke the latch, identifying an over-stroking load on the latch actuator, and based on the over-stroking load on the latch actuator, determining whether the tailgate is overloaded or not overloaded. Over-stroking the latch includes moving the latch in the latching direction from the full-latching position to an over-stroking position, and the over-stroking load on the latch actuator is associated with its operation to over-stroke the latch.

20 Claims, 5 Drawing Sheets

(56) References Cited

U.S. PATENT DOCUMENTS

| | | | | |
|---|---|---|---|---|
| 7,357,435 B2* | 4/2008 | Robertson | ........... | B60R 25/1004 |
| | | | | 296/57.1 |
| 2006/0006676 A1* | 1/2006 | Plett | .................. | B62D 33/0273 |
| | | | | 292/300 |
| 2006/0202652 A1* | 9/2006 | Amagasa | ............ | H02P 29/0241 |
| | | | | 318/434 |
| 2007/0205613 A1* | 9/2007 | Berghahn | ................ | E05B 81/20 |
| | | | | 292/216 |
| 2008/0191499 A1 | 8/2008 | Stein | | |
| 2013/0060403 A1* | 3/2013 | Kerr | ..................... | E05F 15/627 |
| | | | | 701/2 |
| 2014/0225382 A1* | 8/2014 | Kurita | ..................... | E05B 81/20 |
| | | | | 292/201 |
| 2015/0330118 A1* | 11/2015 | Alexander | .............. | E05B 85/10 |
| | | | | 292/200 |
| 2018/0274268 A1* | 9/2018 | Suholutskaja | .......... | E05B 77/28 |

* cited by examiner

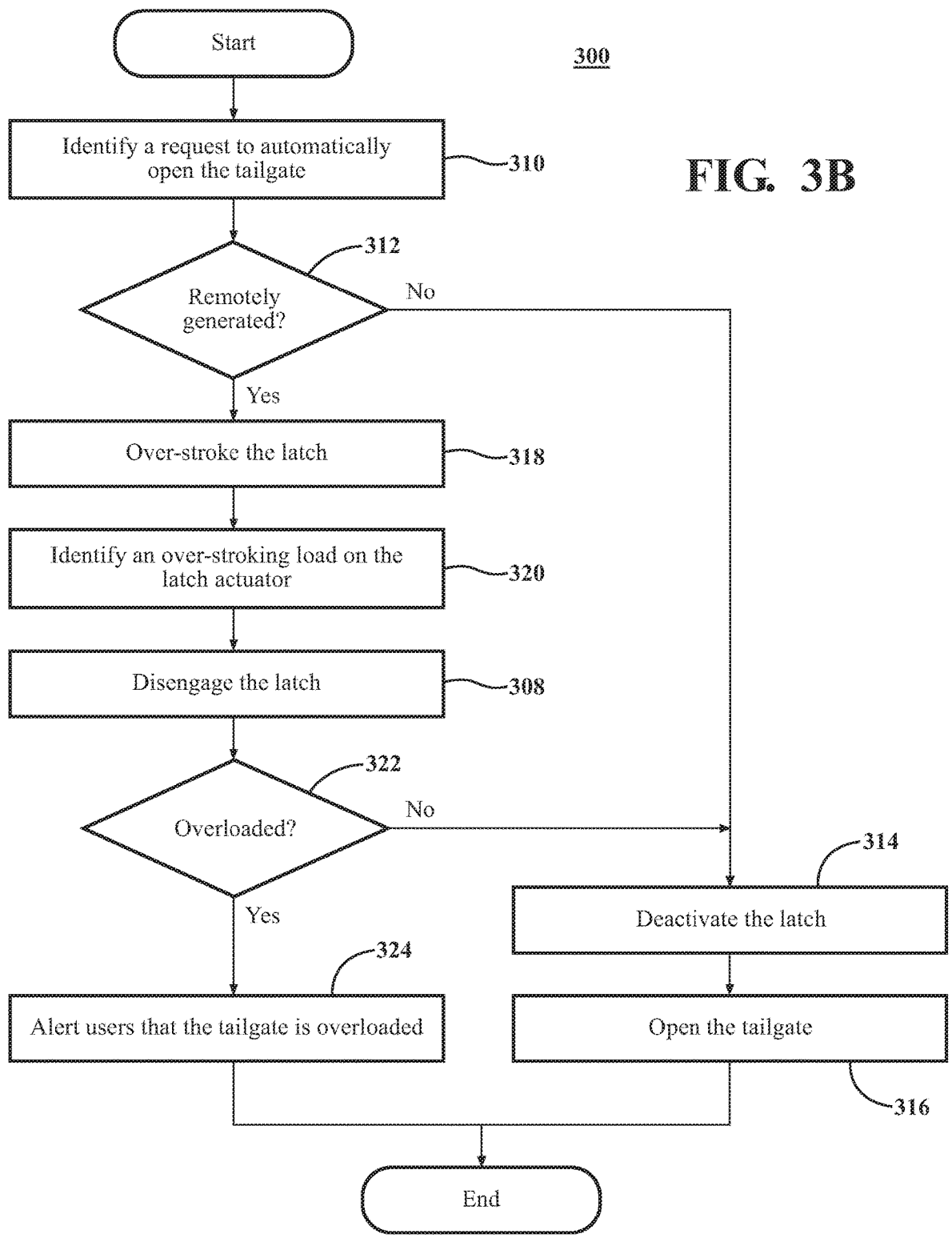

SYSTEMS AND METHODS FOR OPERATING A POWER TAILGATE SYSTEM

TECHNICAL FIELD

The embodiments disclosed herein relate to vehicles with tailgates and, more particularly, to power tailgate systems for automatically opening the tailgates and automatically closing the tailgates.

BACKGROUND

Many vehicles include tailgates. The tailgates serve as closure panels, and are movable between closed positions and open positions. In addition to the tailgates themselves, the vehicles include latch assemblies. Among other things, the latch assemblies include latches for latching the tailgates. To close the tailgates, the latches are activated. When the latches are activated, the latches latch the tailgates as the tailgates are moved to the closed positions, and afterwards, when the tailgates are in the closed positions. To open the tailgates, the latches are deactivated. When the latches are deactivated, the latches unlatch the tailgates as the tailgates are moved to the open positions.

Many of today's vehicles with tailgates also include power tailgate systems. The power tailgate systems include tailgate actuators for the tailgates, and latch actuators for the latch assemblies. By the operation of the tailgate actuators and the latch actuators, the power tailgate systems automatically open the tailgates and automatically close the tailgates. To automatically open the tailgates, the power tailgate systems open the tailgates after deactivating the latches. To automatically close the tailgates, the power tailgate systems close the tailgates after activating the latches.

Among other things, the power tailgate systems accommodate requests to automatically open the tailgates and requests to automatically close the tailgates. Although the power tailgate systems of today's vehicles have proven satisfactory, one contemplated area for improvement concerns vehicles whose tailgates are overloaded. For instance, users may remotely generate requests to automatically open the tailgates when, unbeknownst to them, the tailgates are overloaded with cargo. When the power tailgate systems automatically open the tailgates, the vehicles, including but not limited to the power tailgate systems, as well as the cargo itself, may suffer the threat of damage.

SUMMARY

Disclosed herein are embodiments of systems and methods for operating a power tailgate system. In one aspect, the embodiments include overload checking a tailgate latched by a latch that is in a full-latching position, connected with a latch actuator, and activated by the latch actuator for non-revertible movement in a latching direction. Overload checking the tailgate includes operating the latch actuator to over-stroke the latch, identifying an over-stroking load on the latch actuator, and based on the over-stroking load on the latch actuator, determining whether the tailgate is overloaded or not overloaded. Over-stroking the latch includes moving the latch in the latching direction from the full-latching position to an over-stroking position, and the over-stroking load on the latch actuator is associated with its operation to over-stroke the latch. This and other aspects will be described in additional detail below.

BRIEF DESCRIPTION OF THE DRAWINGS

The various features, advantages and other uses of the present embodiments will become more apparent by referring to the following detailed description and drawing in which:

FIGS. 3A, 3B and 3C portray, with reference to the latch assembly from FIG. 2, the operations of a process for operating the power tailgate system, using partial perspective views and side views, a flow chart and a graph, showing aspects of overload checking the tailgate using the latch actuator to come to a determination whether the tailgate is overloaded or not overloaded, and when the tailgate is overloaded, denying requests to automatically open the tailgate.

DETAILED DESCRIPTION

This disclosure relates to a vehicle that includes a tailgate, a latch for latching the tailgate, and as part of a power tailgate system, a latch actuator connected with the latch. In relation to the vehicle, this disclosure teaches systems and methods for operating the power tailgate system. According to the systems and methods, the power tailgate system may overload check the tailgate using the latch actuator to come to a determination whether the tailgate is overloaded or not overloaded, and when the tailgate is overloaded, deny requests to automatically open the tailgate.

Figure 1A:
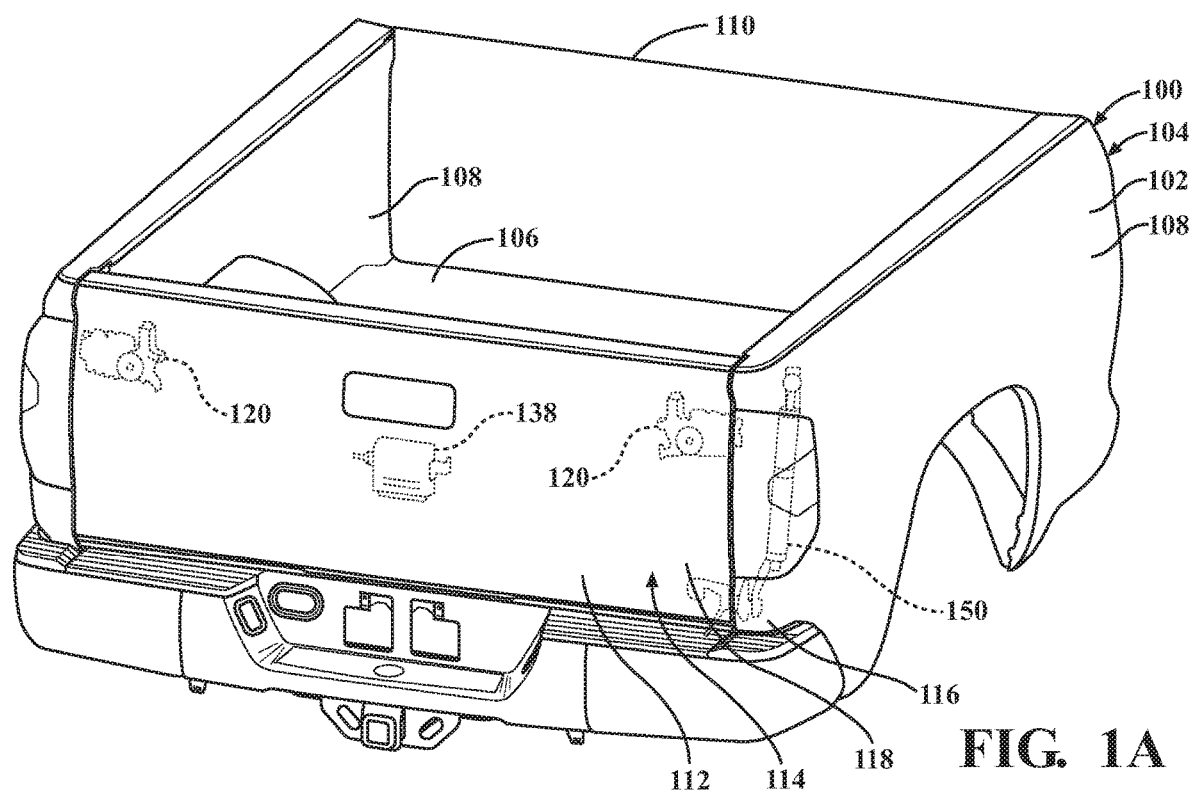
FIGS. 1A, 1B, 1C and 1D portray a vehicle using partial perspective views and a block diagram, showing a bed, a tailgate, tailgate-side latch assemblies that include latches for latching the tailgate, vehicle-side strikers for the latches, and a power tailgate system that includes tailgate actuators for the tailgate, and latch actuators for the latch assemblies.

Part of a representative passenger vehicle 100 is shown in FIG. 1A. As shown, the vehicle 100 is a pickup truck. The vehicle 100 includes an exterior and a number of interior compartments. In the illustrated pickup truck configuration of the vehicle 100, the compartments include an open-topped bed 102 for carrying cargo. In addition to the bed 102, the compartments may include a passenger compartment, an engine compartment and the like. Among other things, the vehicle 100 may include seats, a dash assembly, an instrument panel and the like housed in the passenger compartment. In addition, the vehicle 100 may include an engine, a motor, a transmission and the like, as well as other powertrain components, such as wheels, housed in the engine compartment and elsewhere in the vehicle 100. The wheels support the remainder of the vehicle 100 on the ground. One, some or all of the wheels are powered by the remainder of the powertrain components to drive the vehicle 100 along the ground.

The vehicle 100 includes a body 104 that forms the exterior and defines or otherwise encloses the bed 102 and the other compartments. In relation to the bed 102, the body 104 includes a deck 106, two sides 108, a bulkhead 110 and a rear end 112. At the rear end 112, the body 104 defines a tailgate opening 114. Likewise, the body 104, including but not limited to the sides 108, renders surrounding body 116 that frames the tailgate opening 114. The tailgate opening 114 opens between the bed 102 and the exterior. Relatedly, as part of the rear end 112, the body 104 includes a tailgate 118 corresponding to the tailgate opening 114. This description follows with reference to the tailgate 118 in the illustrated pickup truck configuration of the vehicle 100. However, it will be understood that this disclosure is applicable in principle to otherwise similar vehicles whose bodies include tailgates corresponding to tailgate openings that open between their compartments and their exteriors. For instance, this disclosure is applicable in principle to vehicles whose bodies include liftgates corresponding to liftgate openings that open between their cargo compartments and their exteriors.

Figure 1B:
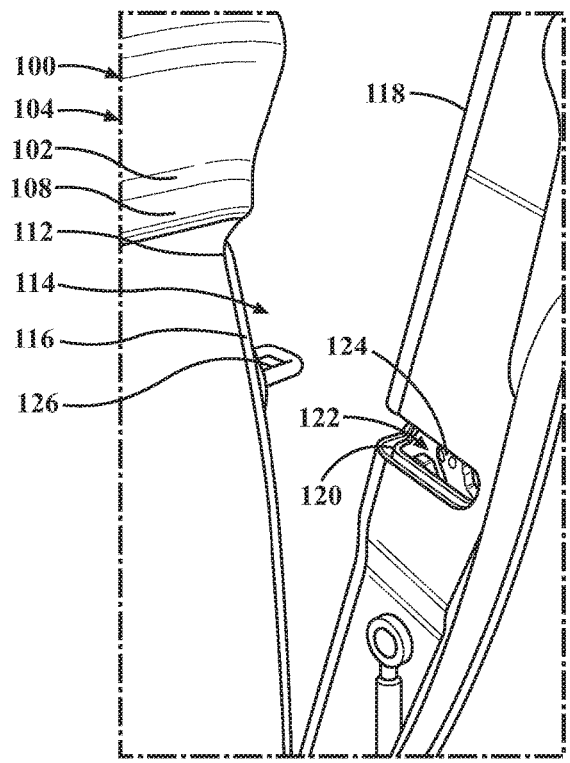
Figure 1C:
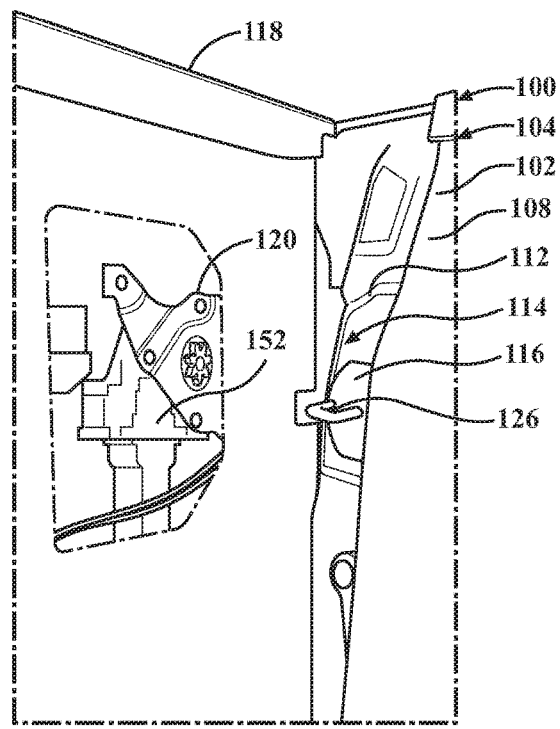

As shown with additional reference to FIGS. 1B and 1C, the tailgate 118 serves as closure panel for the bed 102. The tailgate 118 is pivotally connected to the surrounding body 116 for movement, relative to the tailgate opening 114, between one or more closed positions and one or more open positions. In FIG. 1A, the tailgate 118 is shown in a representative closed position. In the closed positions, the tailgate 118 is positioned over the tailgate opening 114, with the periphery of the tailgate 118 adjacent the surrounding body 116. In FIGS. 1B and 1C, the tailgate 118 is shown in a representative open position. In the open positions, the tailgate 118 is positioned away from the tailgate opening 114, which allows access to the bed 102 from the rear of the vehicle 100.

In relation to opening the tailgate 118 and closing the tailgate 118, the vehicle 100 includes one or more tailgate-side latch assemblies 120. Each latch assembly 120 includes a striker chute 122, and a corresponding latch 124 for latching the tailgate 118. Relatedly, the vehicle 100 includes one or more vehicle-side strikers 126 corresponding to the striker chutes 122 and the latches 124. Each latch assembly 120 is connected to the tailgate 118. Each latch assembly 120 may be housed, in whole or in part, in the tailgate 118. For instance, each latch assembly 120 may be housed in the tailgate 118, and connected to the tailgate 118, as a unitary module. Each striker 126 is connected to the surrounding body 116. Although the vehicle 100, as shown, includes two latch assemblies 120 and two strikers 126, it will be understood that this disclosure is applicable in principle to otherwise similar vehicles 100 including one or more latch assemblies 120 and one or more strikers 126.

Each latch assembly 120 includes one or more latch components, including but not limited to the striker chute 122 and the latch 124. The latch components are connected within the latch assembly 120, and equally, connected within the tailgate 118. From within the latch assembly 120, and equally, from within the tailgate 118, some of the latch components, including but not limited to the striker chute 122, may be immovable. These latch components are not only immovable relative to one another, but also immovable relative to the latch assembly 120, and equally, immovable relative to the tailgate 118. In addition, some of the latch components, including but not limited to the latch 124, may be movable. These latch components are not only movable relative to one another, but also movable relative to the latch assembly 120, and equally, movable relative to the tailgate 118. In any event, all of the latch components, including but not limited to the striker chute 122 and the latch 124, are co-movable with the latch assembly 120, and equally, co-movable with the tailgate 118. With respect to the movement of the latch components, this description follows with reference to the perspective of the tailgate 118. However, it will be understood that this disclosure is applicable in principle to the perspective of the latch assembly 120.

For each corresponding striker chute 122, latch 124 and striker 126, the striker chute 122 opens to the tailgate 118 for passing the striker 126 into and out of the tailgate 118. The latch 124 is movable, relative to the striker chute 122, in a latching direction and in an unlatching direction between one or more unlatching positions and one or more latching positions. In FIG. 1B, the latch 124 is shown in a representative unlatching position. In the unlatching positions, the latch 124 aligns with the striker chute 122 for passing the striker 126 into and out of the tailgate 118. In the latching positions, the latch 124 crosses the striker chute 122 for capturing the striker 126 within the tailgate 118. Accordingly, the latch 124 latches the tailgate 118 to the surrounding body 116 against the striker 126.

The latch 124 may be activated for non-revertible movement in the latching direction. When the tailgate 118 is being closed, the latch 124 functions as the tailgate 118 is moved to the closed positions, and afterward, when the tailgate 118 is in the closed positions. With the tailgate 118 in the open positions, the latch 124, having previously unlatched the tailgate 118, is in an unlatching position. To close the tailgate 118, the latch 124 is activated for non-revertible movement in the latching direction. As the tailgate 118 is moved to the closed positions, the striker 126 passes into the tailgate 118 through the striker chute 122. As it passes into the tailgate 118, the striker 126 moves the latch 124 in the latching direction to a latching position, and the latch 124, unable to move in the unlatching direction to an unlatching position, latches the tailgate 118 to the surrounding body 116 against the striker 126.

In addition, the latch 124 may be deactivated for movement in the unlatching direction. When the tailgate 118 is being opened, the latch 124 functions as the tailgate 118 is moved to the open positions. With the tailgate 118 in the closed positions, the latch 124, having previously latched the tailgate 118, is in a latching position. To open the tailgate 118, the latch 124 is deactivated for movement in the unlatching direction. As the tailgate 118 is moved to the open positions, the striker 126 passes out of the tailgate 118 through the striker chute 122. As it passes out of the tailgate 118, the striker 126, in combination with a bias for movement in the unlatching direction, moves the latch 124 in the unlatching direction to an unlatching position, and the latch 124 unlatches the tailgate 118 from the surrounding body 116 from against the striker 126.

Figure 1D:
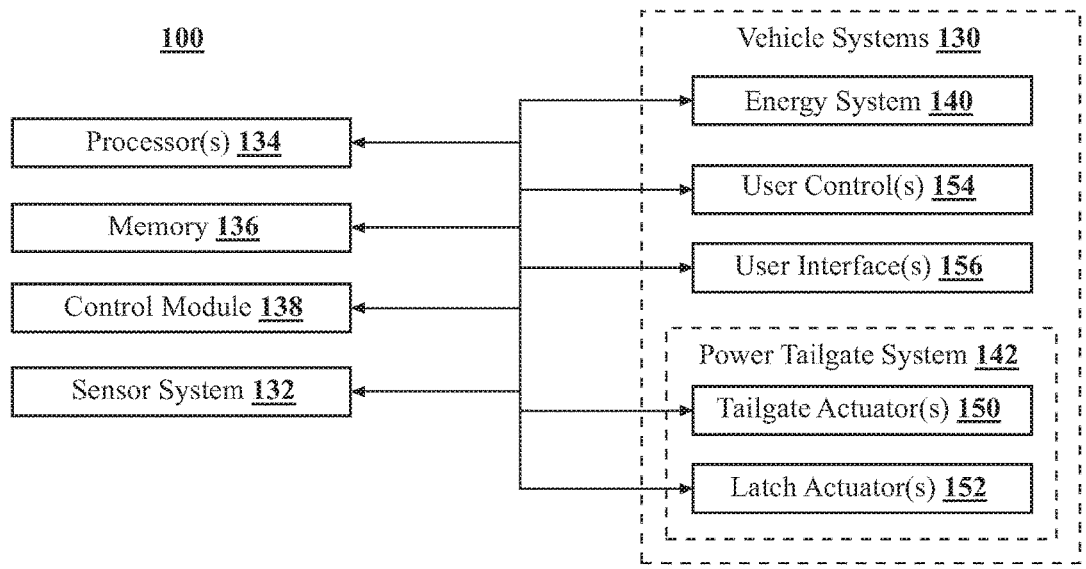

As shown with additional reference to FIG. 1D, the vehicle 100 includes one or more vehicle systems 130 operable to perform vehicle functions. In addition to the vehicle systems 130, the vehicle 100 includes a sensor system 132, as well as one or more processors 134, memory 136, and a control module 138 to which the vehicle systems 130 and the sensor system 132 are communicatively connected. The control module 138 may be housed, in whole or in part, in the tailgate 118. The sensor system 132 is operable to detect information about the vehicle 100. The processors 134, the memory 136 and the control module 138 together serve as a computing device whose control module 138 is employable to orchestrate the operation of the vehicle 100, in whole or in part. Specifically, the control module 138 operates the vehicle systems 130 based on information about the vehicle 100. Accordingly, as a prerequisite to operating the vehicle systems 130, the control module 138 gathers information about the vehicle 100, including the information about the vehicle 100 detected by the sensor system 132. The control module 138 then evaluates the information about the vehicle 100, and operates the vehicle systems 130 based on its evaluation.

The vehicle systems 130 are part of, mounted to or otherwise supported by the body 104. Each vehicle system 130 includes one or more vehicle elements. On behalf of the vehicle system 130 to which it belongs, each vehicle element is operable to perform, in whole or in part, any combination of vehicle functions with which the vehicle system 130 is associated. It will be understood that the vehicle elements, as well as the vehicle systems 130 to which they belong, may but need not be mutually distinct.

The vehicle systems 130 include an energy system 140 and a power tailgate system 142. The power tailgate system 142 is connected to the energy system 140. Moreover, the power tailgate system 142 is connected to the tailgate 118, and to the latch assemblies 120. The energy system 140 is operable to perform one or more energy functions, including but not limited to storing and otherwise handling electrical energy. The power tailgate system 142 is operable to perform one or more power tailgate functions using electrical energy from the energy system 140, including but not limited to automatically opening the tailgate 118 and automatically closing the tailgate 118.

Among the power tailgate elements of the power tailgate system 142, the vehicle 100 includes one or more tailgate actuators 150 for the tailgate 118. Each tailgate actuator 150 may be housed, in whole or in part, in the surrounding body 116. In one implementation, each tailgate actuator 150 is a motor-driven spindle drive. In this and other implementations, each tailgate actuator 150 is connected to the energy system 140. Moreover, each tailgate actuator 150 is connected with the tailgate 118. The tailgate actuators 150 are operable to open the tailgate 118, close the tailgate 118 and otherwise move the tailgate 118 between the closed positions and the open positions using electrical energy from the energy system 140. Although the vehicle 100, as shown, includes two tailgate actuators 150 in the power tailgate system 142, it will be understood that this disclosure is applicable in principle to otherwise similar vehicles 100 including one or more tailgate actuators 150 in the power tailgate system 142.

Also among the power tailgate elements of the power tailgate system 142, the vehicle 100 includes one or more latch actuators 152 for the latch assemblies 120. Each latch actuator 152 corresponds to a latch assembly 120, and may be housed, in whole or in part, in the tailgate 118. For instance, each latch actuator 152 may be housed in the tailgate 118, and connected to the tailgate 118, as a unitary module with the corresponding latch assembly 120. In one implementation, each latch actuator 152 is a motor-driven reduction drive. In this and other implementations, each latch actuator 152 is connected to the energy system 140. Moreover, each latch actuator 152 is connected with the corresponding latch assembly 120. For each corresponding latch assembly 120, latch 124 and latch actuator 152, using electrical energy from the energy system 140, the latch actuator 152 is operable to activate the latch 124 for non-revertible movement in the latching direction, and deactivate the latch 124 for movement in the unlatching direction. Moreover, the latch actuator 152 is operable to disengage the latch 124, move the latch 124 in the latching direction, and move the latch 124 in the unlatching direction. Although the vehicle 100, as shown, includes one latch actuator 152 per latch assembly 120 in the power tailgate system 142, it will be understood that this disclosure is applicable in principle to otherwise similar vehicles 100 including one or more latch actuators 152 per latch assembly 120 in the power tailgate system 142.

The vehicle 100 includes one or more user controls 154 and one or more user interfaces 156 for the power tailgate system 142. In the vehicle 100, the user controls 154 and the user interfaces 156 may be part of an infotainment system typical of vehicles, or dedicated to the power tailgate system 142. The user controls 154 serve as interfaces between users and the vehicle 100 itself, and are operable to receive mechanical, verbal and other user inputs for generating requests. Similarly, the user interfaces 156 serve as interfaces between users and the vehicle 100 itself, and are operable to issue tactile, sound and visual outputs that may be sensed by users. For instance, the vehicle 100 may include one or more onboard or off-board user controls 154 for remotely generating requests to automatically open the tailgate 118 from in the passenger compartment or otherwise away from the tailgate 118 (e.g., an onboard user control 154 in the passenger compartment, an off-board user control 154 located away from the tailgate 118, etc.). For instance, the vehicle 100 may include one or more onboard or off-board user controls 154 for non-remotely generating requests to automatically open the tailgate 118 from the rear of the vehicle 100 or otherwise adjacent the tailgate 118 (e.g., an onboard user control 154 on the rear of the vehicle 100, an off-board user control 154 located adjacent the tailgate 118, etc.).

As part of the sensor system 132, the vehicle 100 includes one or more onboard sensors. The sensors monitor the vehicle 100 in real-time. The sensors, on behalf of the sensor system 132, are operable to detect information about the vehicle 100, including information about the operation of the vehicle 100. Among the sensors, the vehicle 100 includes one or more tailgate sensors, one or more latch sensors, one or more controller area network (CAN) sensors and the like. Relatedly, among information about the operation of the vehicle 100, the sensor system 132 is operable to detect the movement of the tailgate 118, the movement of the latches 124, requests to automatically open the tailgate 118, requests to automatically close the tailgate 118, and the operational statuses of one, some or all of the vehicle systems 130, including the energy system 140, the tailgate actuators 150 and the latch actuators 152.

Figure 2:
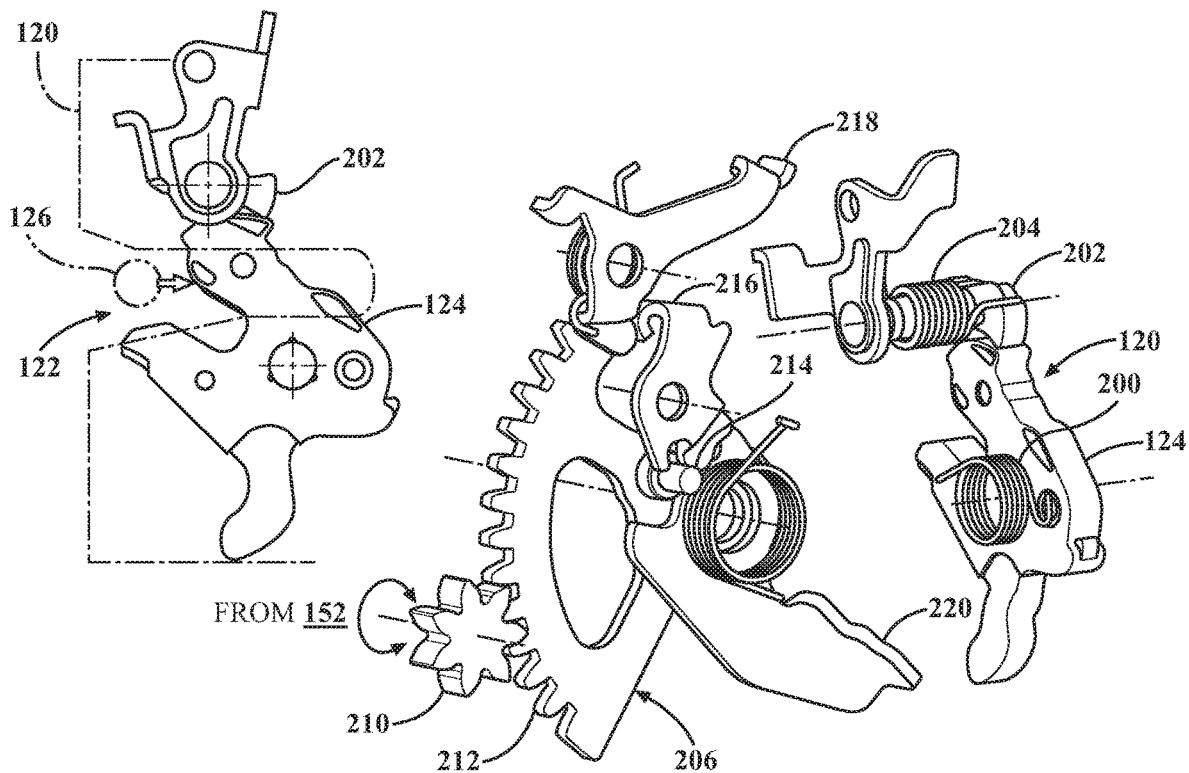
FIG. 2 portrays a latch assembly using a partial perspective view and a side view, showing latch components, including the latch, a pawl for the latch, and a control linkage for the pawl and the latch that the latch actuator for the latch is operable to drive.

A representative latch assembly 120, whose exterior is removed to better view movable latch components, is shown in FIG. 2. As shown, the latch assembly 120 is rendered by shaft-supported rotary latch components. As shown with reference to a phantom rendering of the striker chute 122, among the movable latch components of the latch assembly 120, the tailgate 118 includes the latch 124, as noted above, as well as a latch spring 200 for the latch 124, a pawl 202 for the latch 124, a pawl spring 204 for the pawl 202, and a control linkage 206 for the pawl 202 and the latch 124. In FIG. 2, the latch 124 is shown in a representative unlatching position. The latch 124 is biased, by the latch spring 200, for movement in the unlatching direction. The pawl 202 is biased, by the pawl spring 204, for engagement with the latch 124. In FIG. 2, the pawl 202 is shown engaging the latch 124. When the pawl 202 engages the latch 124, the latch 124 is non-revertibly movable in the latching direction. When the pawl 202 disengages the latch 124, the latch 124 is movable in the unlatching direction. Accordingly, in a normally-activated configuration, the pawl 202 normally engages the latch 124, and with the pawl 202 normally engaging the latch 124, the latch 124 is normally activated for non-revertible movement in the latching direction. Likewise, the latch 124 is deactivated for movement in the unlatching direction when the pawl 202 is disengaged from the latch 124.

The corresponding latch actuator 152 for the latch 124 is connected with the control linkage 206. The latch actuator 152 is operable to drive the control linkage 206 using electrical energy from the energy system 140. As the product of driving the control linkage 206, the latch actuator 152 is operable to disengage the pawl 202 and disengage the latch 124 at the same time, and otherwise, disengage the pawl 202 from the latch 124 and move the latch 124 in the latching direction one at a time. With the pawl 202 normally engaging the latch 124, as the product of disengaging the pawl 202, the latch actuator 152 is operable to activate the latch 124 for non-revertible movement in the latching direction at the same time as either disengaging the latch 124, moving the latch 124 in the latching direction, or moving the latch 124 in the unlatching direction. As the product of disengaging the pawl 202 from the latch 124, the latch actuator 152 is operable to deactivate the latch 124 for movement in the unlatching direction at the same time as disengaging the latch 124.

As shown, the control linkage 206 includes a pinion gear 210. The latch actuator 152 is connected with the control linkage 206 at the pinion gear 210, and is operable to drive the control linkage 206 through the pinion gear 210 using electrical energy from the energy system 140. In succession from the pinion gear 210 to the pawl 202 and to the latch 124, the control linkage 206 includes a sector gear 212 meshed with the pinion gear 210, and a drive pin 214 on the sector gear 212. In further succession to the pawl 202, the control linkage 206 includes a pawl crank 216 and a pawl lever 218. In further succession to the latch 124, the control linkage 206 includes a latch lever 220. The pinion gear 210 is movable in a counterclockwise direction and in a clockwise direction. In FIG. 2, the control linkage 206 is shown idled after having been driven by the latch actuator 152 to disengage the pawl 202 and disengage the latch 124. Through the pinion gear 210, the sector gear 212, the drive pin 214, the pawl crank 216 and the pawl lever 218, the control linkage 206 is drivable by the latch actuator 152 by moving the pinion gear 210 in the counterclockwise direction until the pawl lever 218 disengages the pawl 202 from the latch 124, and thereafter, in the clockwise direction until the pawl lever 218 disengages the pawl 202. Alternatively, through the pinion gear 210, the sector gear 212, the drive pin 214 and the latch lever 220, the control linkage 206 is drivable by the latch actuator 152 by moving the pinion gear 210 in the clockwise direction until the latch lever 220 moves the latch 124 in the latching direction, and thereafter, in the counterclockwise direction until the latch lever 220 disengages the latch 124 after moving the latch 124 in the unlatching direction.

Figure 3A:
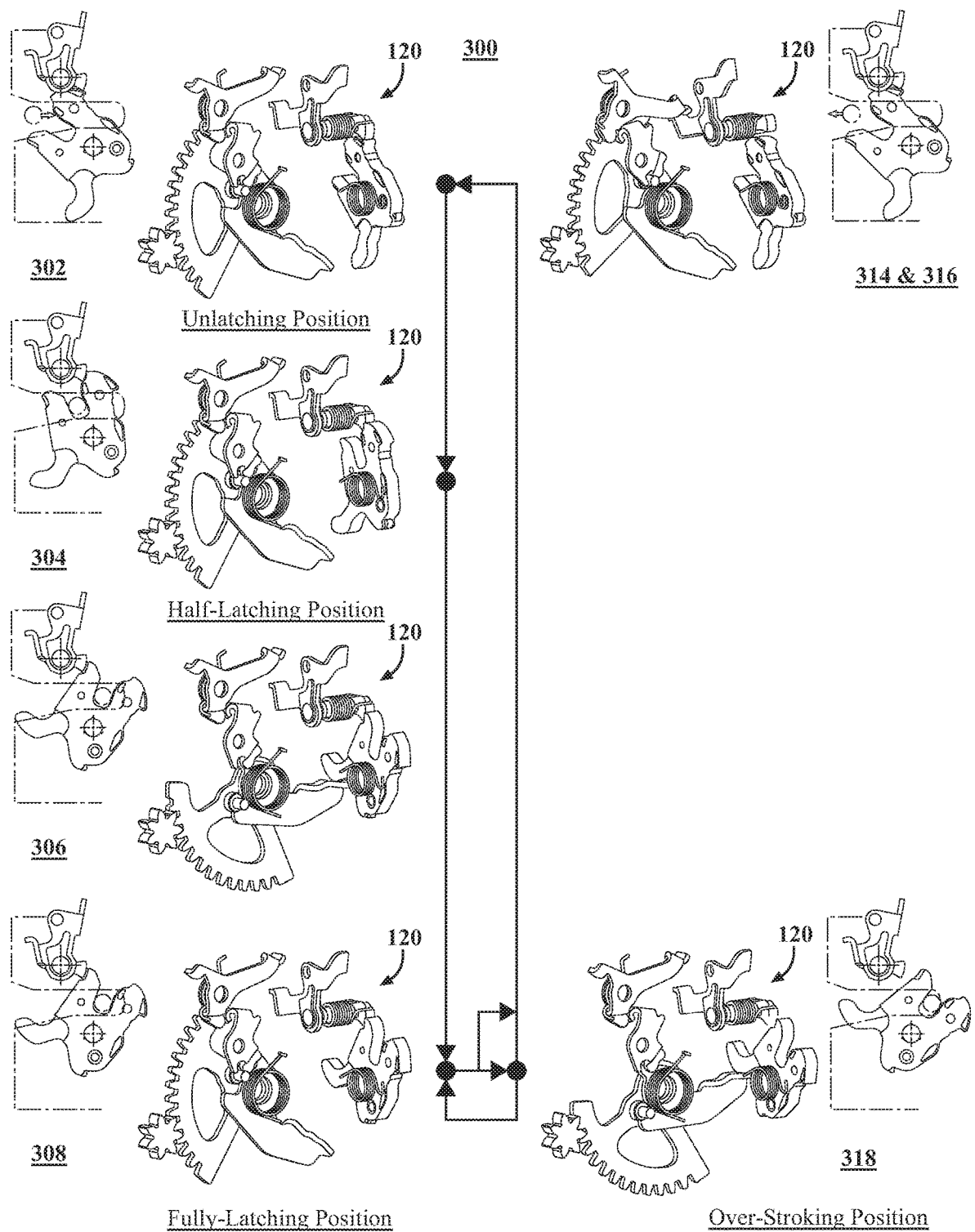
Figure 3C:
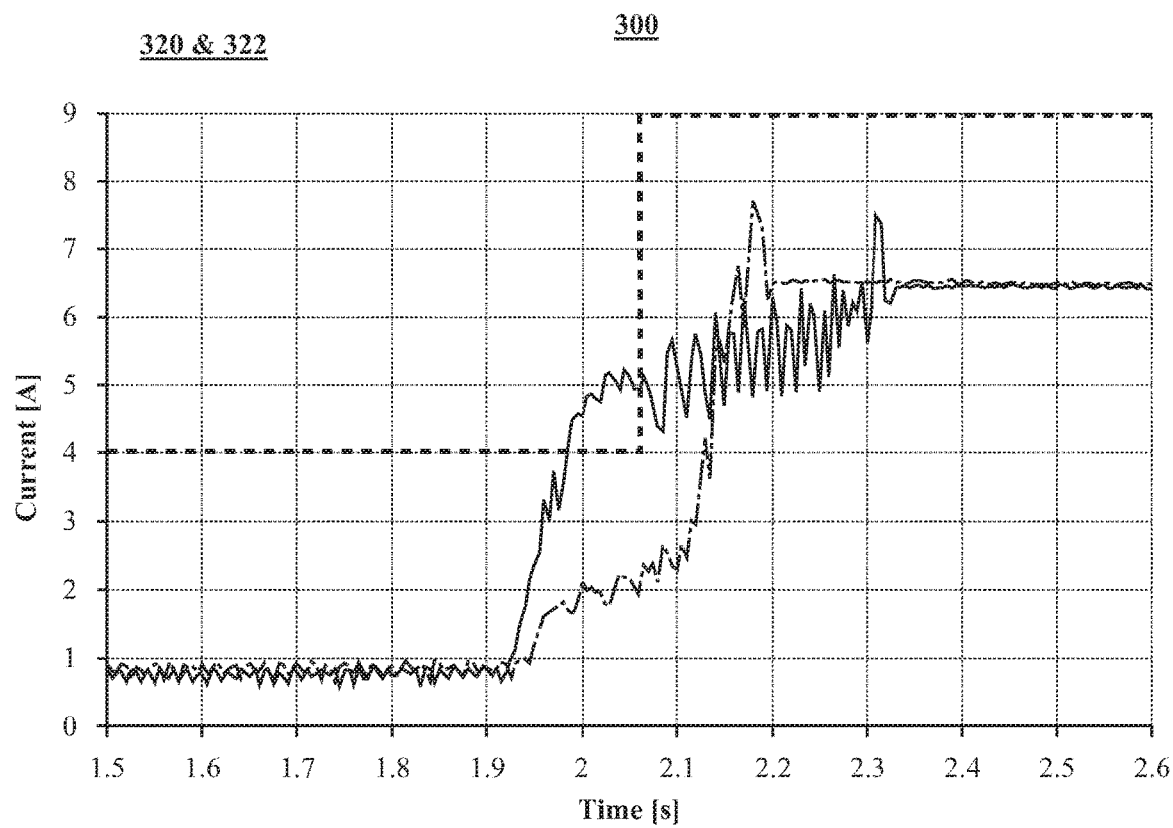
Figure 3C:
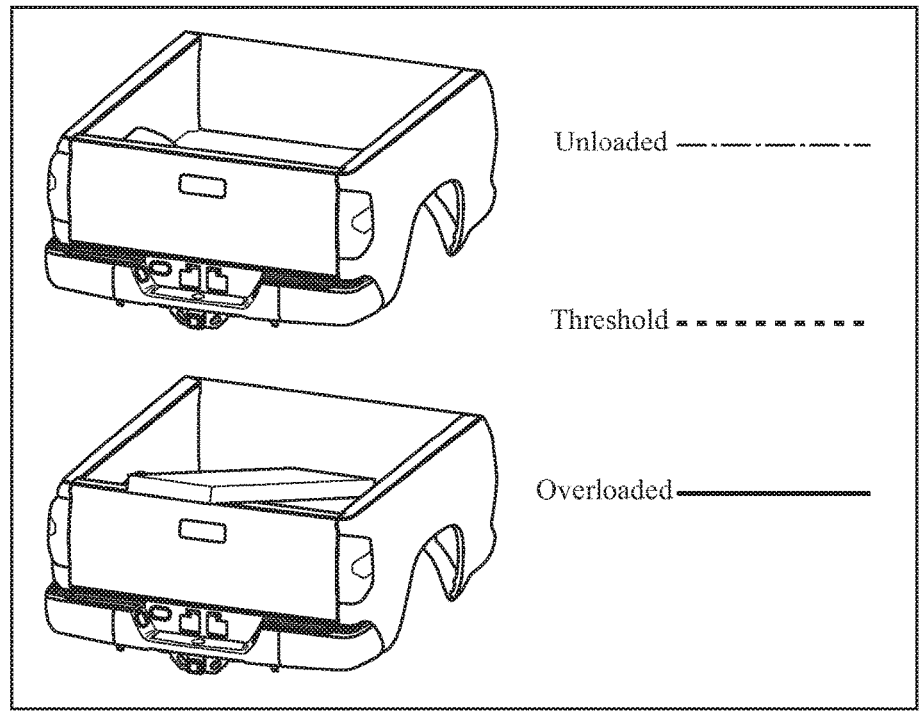

The operations of a process 300 for operating the power tailgate system 142 are shown in FIGS. 3A, 3B and 3C. According to the process 300, the power tailgate system 142 may overload check the tailgate 118 using the latch actuator 152 to come to a determination whether the tailgate 118 is overloaded or not overloaded, and when the tailgate 118 is overloaded, deny requests to automatically open the tailgate 118. For instance, users may remotely generate requests to automatically open the tailgate 118 when, unbeknownst to them, the tailgate 118 is overloaded with cargo. According to the process 300, the power tailgate system 142 may deny the requests to automatically open the tailgate 118, and instead, alert the users that the tailgate 118 is overloaded. Accordingly, the vehicle 100, including but not limited to the power tailgate system 142, as well as the cargo itself, does not suffer the threat of damage. Although the process 300 is described with reference to one tailgate actuator 150, and one latch actuator 152 and corresponding latch assembly 120 and latch 124, it will be understood that this disclosure is applicable in principle to otherwise similar processes 300 for one or more tailgate actuators 150, one or more latch actuators 152, one or more latch assemblies 120 and one or more latches 124.

FIG. 3A shows the latch assembly 120 from FIG. 2. According to the process 300, the latch assembly 120 and the tailgate 118 are configured such that in addition to an unlatching position, a half-latching position and a full-latching position, the latch 124 has an over-stroking position past the full-latching position. For instance, the latch assembly 120 and the tailgate 118 may be configured such that from the perspective of the latch actuator 152, the latch 124 is substantially unobstructed for movement in the latching direction from the full-latching position to the over-stroking position. The unlatching position, the half-latching position, the full-latching position and the over-stroking position are consecutive in the latching direction and in the unlatching direction.

In the context of the vehicle 100, the movement of the latch 124 and the movement of the tailgate 118 have an interdependent relationship. In correspondence with the unlatching position, the half-latching position, the full-latching position and the over-stroking position, the tailgate 118 and the surrounding body 116 are configured such that in addition to one or more open positions, in which the tailgate 118 is unaligned with the surrounding body 116, a near-closed position, in which the tailgate 118 is in near alignment with the surrounding body 116, and a fully-closed position, in which the tailgate 118 is in alignment with the surrounding body 116, the tailgate 118 has an over-closed position past the fully-closed position, in which the tailgate 118 is past alignment with the surrounding body 116. For instance, the tailgate 118 and the surrounding body 116 may be configured such that from the perspective of the latch actuator 152, the tailgate 118 is substantially unobstructed for movement from the fully-closed position to the over-closed position.

According to the process 300, the control module 138 gathers information about the vehicle 100 for evaluation, including the movement of the tailgate 118, the movement of the latch 124, requests to automatically open the tailgate 118, requests to automatically close the tailgate 118, the operational statuses of the energy system 140, the tailgate actuator 150 and the latch actuator 152, and other information about the vehicle 100 detected by the sensor system 132. For instance, with respect to the movement of the latch 124, the control module 138 monitors for and identifies unlatching events indicating movement of the latch 124 to the unlatching position. Likewise, the control module 138 monitors for and identifies half-latching events, full-latching events and over-stroking events respectively indicating movement of the latch 124 to the half-latching position, to the full-latching position and to the over-stroking position. For instance, with respect to the operational statuses of the energy system 140 and the latch actuator 152, the control module 138 monitors for and identifies the load on the latch actuator 152, such as the electrical energy drawn by the latch actuator 152 from the energy system 140, the speed of the latch actuator 152 and the like, associated with the operation of the latch actuator 152.

In operation 302, following the control module 138 automatically opening the tailgate 118 according to operations 314 and 316, the latch 124 is in the unlatching position, and activated for non-revertible movement in the latching direction. Accordingly, the latch 124 is movable in the latching direction from the unlatching position to the half-latching position, and thereafter, is not movable in the unlatching direction past the half-latching position.

In operation 304, in response to a request to automatically close the tailgate 118, the control module 138 operates the tailgate actuator 150 to close the tailgate 118 until the tailgate 118 reaches the near-closed position. As the tailgate 118 is moved to the near-closed position, the striker 126 passes into the tailgate 118 through the striker chute 122. As it passes into the tailgate 118, the striker 126 moves the latch 124 in the latching direction from the unlatching position to the half-latching position.

With the latch 124 in the half-latching position and activated for non-revertible movement in the latching direction, the latch 124, although movable in the latching direction from the half-latching position to the full-latching position, is not movable in the unlatching direction past the half-latching position. Accordingly, the latch 124, unable to move in the unlatching direction to the unlatching position, latches the tailgate 118 to the surrounding body 116 against the striker 126 in the near-closed position.

In operation 306, the control module 138 identifies the accompanying half-latching event, and in response to identifying the half-latching event, operates the latch actuator 152 to move the latch 124 in the latching direction from the half-latching position to the full-latching position. For instance, the control module 138 may operate the latch actuator 152 to move the latch 124 in the latching direction until it identifies a full-latching event. As it moves in the latching direction from the half-latching position to the full-latching position, the latch 124, drawing the striker 126 further into the tailgate 118, moves the tailgate 118 against the striker 126 from the near-closed position to the fully-closed position.

In operation 308, the control module 138 identifies the accompanying full-latching event, and in response to identifying the full-latching event, operates the latch actuator 152 to disengage the latch 124 without deactivating the latch 124 for movement in the unlatching direction. With the latch 124 in the full-latching position and activated for non-revertible movement in the latching direction, the latch 124, although movable in the latching direction from the full-latching position to the over-stroking position, and movable in the unlatching direction from the over-stroking position to the full-latching position, is not movable in the unlatching direction past the full-latching position. Accordingly, the latch 124, unable to move in the unlatching direction to the half-latching position, latches the tailgate 118 to the surrounding body 116 against the striker 126 in the fully-closed position.

As shown with additional reference to FIG. 3B, in operation 310, as part of its evaluation of the information about the vehicle 100, the control module 138 monitors for and identifies a request to automatically open the tailgate 118. When the control module 138 does not identify a request to automatically open the tailgate 118, it continues to monitor for requests to automatically open the tailgate 118 in anticipation that a request to automatically open the tailgate 118 will materialize.

In operation 312, the control module 138 identifies whether the request to automatically open the tailgate 118 is remotely generated or non-remotely generated. When the request to automatically open the tailgate 118 is non-remotely generated, the control module 138 automatically opens the tailgate 118 according to operations 314 and 316. For instance, it may be assumed that users adjacent the tailgate 118 know whether the tailgate 118 is overloaded or not overloaded, and will not generate requests to automatically open the tailgate 118 when they know that the tailgate 118 is overloaded.

In operation 314, the control module 138 operates the latch actuator 152 to deactivate the latch 124 for movement in the unlatching direction. In operation 316, the control module 138 operates the tailgate actuator 150 to open the tailgate 118. As the tailgate 118 is moved to the open positions, the striker 126 passes out of the tailgate 118 through the striker chute 122. As it passes out of the tailgate 118, the striker 126, in combination with the bias for movement in the unlatching direction, moves the latch 124 in the unlatching direction to the unlatching position. As part of a return loop to operation 302, the control module 138 identifies the accompanying unlatching event, and in response to identifying the unlatching event, operates the latch actuator 152 to activate the latch 124 for non-revertible movement in the latching direction at the same time as disengaging the latch 124.

Otherwise, when the request to automatically open the tailgate 118 is remotely generated, the control module 138 overload checks the tailgate 118 according to operations 318, 320 and 322. For instance, it may be assumed that users away from the tailgate 118 may not know whether the tailgate 118 is overloaded or not overloaded, and may generate requests to automatically open the tailgate 118 when, unbeknownst to them, the tailgate 118 is overloaded.

In operation 318, the control module 138 operates the latch actuator 152 to over-stroke the latch 124. Specifically, the control module 138 operates the latch actuator 152 to move the latch 124 in the latching direction from the full-latching position to the over-stroking position. For instance, the control module 138 may operate the latch actuator 152 to move the latch 124 in the latching direction until it identifies an over-stroking event. As it moves in the latching direction from the full-latching position to the over-stroking position, the latch 124, drawing the striker 126 further into the tailgate 118, moves the tailgate 118 against the striker 126 from the fully-closed position to the over-closed position. Thereafter, the control module 138 operates the latch actuator 152 to move the latch 124 in the unlatching direction from the over-stroking position to the full-latching position. For instance, the control module 138 may operate the latch actuator 152 to move the latch 124 in the unlatching direction until it identifies a full-latching event. As it moves in the unlatching direction from the over-stroking position to the full-latching position, the latch 124, letting the striker 126 less into the tailgate 118, moves the tailgate 118 against the striker 126 from the over-closed position to the fully-closed position. Following operating the latch actuator 152 to over-stroke the latch 124 according to operation 318, the control module 138 operates the latch actuator 152 to disengage the latch 124 without deactivating the latch 124 for movement in the unlatching direction according to operation 308.

In operation 320, as part of its evaluation of the information about the vehicle 100, the control module 138 identifies an over-stroking load on the latch actuator 152. The over-stroking load on the latch actuator 152 is associated with its operation to over-stroke the latch 124. For instance, the over-stroking load on the latch actuator 152 may be associated with any combination of its operation to move the latch 124 in the latching direction from the full-latching position to the over-stroking position, in whole or in part, and its operation to move the latch 124 in the unlatching direction from the over-stroking position to the full-latching position, in whole or in part. For instance, the over-stroking load on the latch actuator 152 may be quantified in terms of any combination of the electrical energy drawn by the latch actuator 152, the speed of the latch actuator 152 and the like.

To aid the accuracy of its identification of over-stroking load on the latch actuator 152 according to operation 320, the control module 138 may factor in any combination of ambient temperature, the speed of the latch 124 associated with the operation of the latch actuator 152 to over-stroke the latch 124, the speed of the latch actuator 152 associated with its operation to over-stroke the latch 124, and the like. In addition, or alternatively, the control module 138 may curb the operation of the latch actuator 152 to over-stroke the latch 124 according to operation 318. For instance, the control module 138 may curb the operation of the latch actuator 152 to over-stroke the latch 124 according to operation 318 compared to its operation to move the latch 124 in the latching direction from the half-latching position to the full-latching position according to operation 306. For instance, the control module 138 may curb the operation of the latch actuator 152 to over-stroke the latch 124 in terms of any combination of the electrical energy drawn by the latch actuator 152, the speed of the latch actuator 152 and the like. For instance, with respect to electrical energy, the control module 138 may operate the latch actuator 152 at a full voltage to move the latch 124 in the latching direction from the half-latching position to the full-latching position according to operation 306, and operate the latch actuator 152 at a lower voltage to over-stroke the latch 124 according to operation 318. For instance, the control module 138 may use pulse width modulation (PWM) to operate the latch actuator 152 at a lower voltage to over-stroke the latch 124 according to operation 318.

In operation 322, based on the over-stroking load on the latch actuator 152, the control module 138 determines whether the tailgate 118 is overloaded or not overloaded. For instance, the control module 138 may determine whether the tailgate 118 is overloaded or not overloaded using logic reflecting that increasing over-stroking loads on the latch actuator 152 are increasingly indicative that the tailgate 118 is overloaded. For instance, the control module 138 may compare the over-stroking load on the latch actuator 152 to a threshold associated with the tailgate 118 being not overloaded. For purposes of comparison, the threshold may be quantified similarly to the over-stroking load on the latch actuator 152. For instance, the threshold may be quantified in terms of any combination of electrical energy, speed and the like. For instance, the threshold may reflect when there is no loading on the tailgate 118. For instance, the threshold may reflect when there is some loading on the tailgate 118, but not enough for the vehicle 100, including but not limited to the power tailgate system 142, to suffer the threat of damage when the power tailgate system 142 automatically opens the tailgate 118. For instance, the control module 138 may determine that the tailgate 118 is overloaded when the over-stroking load on the latch actuator 152 meets the threshold, and determine that the tailgate 118 is not overloaded when the over-stroking load on the latch actuator 152 does not meet the threshold.

In one implementation, the over-stroking load on the latch actuator 152 may be associated with its operation to move the latch 124 in the latching direction from the full-latching position to the over-stroking position. Regardless of whether the tailgate 118 is overloaded or not overloaded, as time elapses following the start of its operation to move the latch 124 in the latching direction from the full-latching position to the over-stroking position, the load on the latch actuator 152 may peak higher than the threshold. Accordingly, the over-stroking load on the latch actuator 152 may be the load on the latch actuator 152 during a predetermined time following the start of its operation to move the latch 124 in the latching direction from the full-latching position to the over-stroking position.

As shown with additional reference to FIG. 3C, in one implementation, the over-stroking load on the latch actuator 152 is an over-stroking electrical energy, and in particular, current, drawn by the latch actuator 152 associated with its operation to move the latch 124 in the latching direction from the full-latching position to the over-stroking position. As shown, the over-stroking electrical energy drawn by the latch actuator 152 is the electrical energy drawn by the latch actuator 152 during a predetermined time following the start of its operation to move the latch 124 in the latching direction from the full-latching position to the over-stroking position. As shown, the control module 138 compares the over-stroking electrical energy drawn by the latch actuator 152 to a threshold, and in particular, a current threshold, associated with the tailgate 118 being not overloaded. The control module 138 determines that the tailgate 118 is overloaded when the over-stroking electrical energy drawn by the latch actuator 152 meets the threshold, and determines that the tailgate 118 is not overloaded when the over-stroking electrical energy drawn by the latch actuator 152 does not meet the threshold.

In one implementation, the over-stroking load on the latch actuator 152 is an over-stroking speed, and in particular, rotational speed, of the latch actuator 152 associated with its operation to move the latch 124 in the latching direction from the full-latching position to the over-stroking position. In this implementation, the over-stroking speed of the latch actuator 152 is the speed of the latch actuator 152 during a predetermined time following the start of its operation to move the latch 124 in the latching direction from the full-latching position to the over-stroking position. In this implementation, the control module 138 compares the over-stroking speed of the latch actuator 152 to a threshold, and in particular, a rotational speed threshold, associated with the tailgate 118 being not overloaded. The control module 138 determines that the tailgate 118 is overloaded when the over-stroking speed of the latch actuator 152 meets the threshold, and determines that the tailgate 118 is not overloaded when the over-stroking speed of the latch actuator 152 does not meet the threshold.

When the tailgate 118 is not overloaded, the control module 138 automatically opens the tailgate 118 according to operations 314 and 316. When the tailgate 118 is overloaded, the control module 138 does not further operate the latch actuator 152. Following the control module 138 operating the latch actuator 152 to disengage the latch 124 without deactivating the latch 124 for movement in the unlatching direction according to operation 308, the latch 124 latches the tailgate 118 to the surrounding body 116 against the striker 126 in the fully-closed position. Accordingly, the control module 138 effectively denies the request to automatically open the tailgate 118 identified according to operation 310. In addition, in operation 324, the control module 138 operates one or more of the user interfaces 156 to issue an alert that the tailgate 118 is overloaded. For instance, the alert that the tailgate 118 is overloaded may be rendered by any combination of one or more tactile outputs, one or more sound outputs, one or more visual outputs and the like ranging from an audible buzz to a full explanation concerning the determination that the tailgate 118 is overloaded.

With respect to overload checking the tailgate 118 according to operations 318, 320 and 322, it is contemplated that the control module 138 may advantageously leverage, in whole or in part, existing mechanical, electrical, communications and like hardware architectures to identify whether the request to automatically open the tailgate 118 is remotely generated or non-remotely generated according to operation 312, operate the latch actuator 152 to over-stroke the latch 124 according to operation 318, identify the over-stroking load on the latch actuator 152, including but not limited to aiding the accuracy of its identification of over-stroking load on the latch actuator 152, according to operation 320, and ultimately determine whether the tailgate 118 is overloaded or not overloaded according to operation 320. For instance, overload checking the tailgate 118 according to operations 318, 320 and 322 may obviate the need for or augment cameras and like sensors for determining whether the tailgate 118 is overloaded or not overloaded.

With reference once again to FIG. 1D, as noted above, the processors 134, the memory 136 and the control module 138 together serve as a computing device whose control module 138 orchestrates the operation of the vehicle 100, including but not limited to the operation of the vehicle systems 130. The control module 138 may be a dedicated control module for the power tailgate system 142, and may be housed, in whole or in part, in the tailgate 118. Relatedly, as part of a central control system, the vehicle 100 may include a global control unit (GCU) to with which the control module 138 is communicatively connected. Alternatively, the control module 138 may be a global control module. Relatedly, as part of a central control system, the vehicle 100 may include a global control unit (GCU) to which the control module 138 belongs. Although the vehicle 100, as shown, includes one control module 138, it will be understood that this disclosure is applicable in principle to otherwise similar vehicles 100 including multiple control modules 138.

The processors 134 may be any components configured to execute any of the processes described herein or any form of instructions to carry out such processes or cause such processes to be performed. The processors 134 may be implemented with one or more general-purpose or special-purpose processors. Examples of suitable processors 134 include microprocessors, microcontrollers, digital signal processors or other forms of circuitry that execute software. Other examples of suitable processors 134 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 134 may include at least one hardware circuit (e.g., an integrated circuit) configured to carry out instructions contained in program code. In arrangements where there are multiple processors 134, the processors 134 may work independently from each other or in combination with one another.

The memory 136 is a non-transitory computer readable medium. The memory 136 may include volatile or nonvolatile memory, or both. Examples of suitable memory 136 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 136 includes stored instructions in program code. Such instructions are executable by the processors 134 or the control module 138. The memory 136 may be part of the processors 134 or the control module 138, or may be communicatively connected the processors 134 or the control module 138.

Generally speaking, the control module 138 includes instructions that may be executed by the processors 134. The control module 138 may be implemented as computer readable program code that, when executed by the processors 134, execute one or more of the processes described herein. Such computer readable program code may be stored on the memory 136. The control module 138 may be part of the processors 134, or may be communicatively connected the processors 134.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for operating a power tailgate system, the system comprising:
   one or more processors; and
   a memory communicably coupled to the one or more processors, the memory storing instructions that when executed by the one or more processors cause the one or more processors to:
      identify a user input-based request to automatically open a tailgate when the tailgate is latched by a latch movable in a latching direction and in an unlatching direction, and connected with a latch actuator operable to disengage the latch, move the latch in the latching direction, and move the latch in the unlatching direction, and when the latch is in a full-latching position, activated by the latch actuator for non-revertible movement in the latching direction, whereby the latch is not movable in the unlatching direction past the full-latching position, and subject to deactivation by the latch actuator for movement in the unlatching direction, whereby the latch is movable in the unlatching direction; and
      overload check the tailgate in response to the request to automatically open the tailgate, wherein overload checking the tailgate includes:
         a) operating the latch actuator to over-stroke the latch, wherein over-stroking the latch includes moving the latch in the latching direction from the full-latching position to an over-stroking position;
         b) identifying an over-stroking load on the latch actuator, the over-stroking load on the latch actuator associated with its operation to over-stroke the latch; and
         c) based on the over-stroking load on the latch actuator, determining whether the tailgate is overloaded or not overloaded.

2. The system of claim 1, wherein over-stroking the latch includes moving the latch in the unlatching direction from the over-stroking position to the full-latching position.

3. The system of claim 1, wherein:
   identifying the over-stroking load on the latch actuator includes:
      identifying an over-stroking electrical energy drawn by the latch actuator, the over-stroking electrical energy drawn by the latch actuator associated with its operation to over-stroke the latch; and determining whether the tailgate is overloaded or not overloaded includes:
comparing the over-stroking electrical energy drawn by the latch actuator to a threshold;
determining that the tailgate is overloaded when the over-stroking electrical energy drawn by the latch actuator meets the threshold; and
determining that the tailgate is not overloaded when the over-stroking electrical energy drawn by the latch actuator does not meet the threshold.

4. The system of claim 3, wherein the over-stroking electrical energy drawn by the latch actuator is associated with its operation to move the latch in the latching direction from the full-latching position to the over-stroking position, and is an electrical energy drawn by the latch actuator during a predetermined time following the start of its operation to move the latch in the latching direction from the full-latching position to the over-stroking position.

5. The system of claim 1, wherein the memory further stores instructions that when executed by the one or more processors cause the one or more processors to:
when the tailgate is overloaded:
operate the latch actuator to disengage the latch without deactivating the latch for movement in the unlatching direction; and
operate a user interface to issue an alert that the tailgate is overloaded.

6. The system of claim 1, wherein the memory further stores instructions that when executed by the one or more processors cause the one or more processors to:
identify whether the request to automatically open the tailgate is remotely generated or non-remotely generated;
when the request to automatically open the tailgate is remotely generated:
overload check the tailgate; and
when the tailgate is not overloaded:
operate the latch actuator to deactivate the latch for movement in the unlatching direction; and
operate a tailgate actuator connected with the tailgate to open the tailgate; and
when the request to automatically open the tailgate is non-remotely generated:
operate the latch actuator to deactivate the latch for movement in the unlatching direction.

7. A method for operating a power tailgate system, the method comprising:
identifying a user input-based request to automatically open a tailgate when the tailgate is latched by a latch movable in a latching direction and in an unlatching direction, and connected with a latch actuator operable to disengage the latch, move the latch in the latching direction, and move the latch in the unlatching direction, and when the latch is in a full-latching position, activated by the latch actuator for non-revertible movement in the latching direction, whereby the latch is not movable in the unlatching direction past the full-latching position, and subject to deactivation by the latch actuator for movement in the unlatching direction, whereby the latch is movable in the unlatching direction; and
overload checking the tailgate in response to the request to automatically open the tailgate, wherein overload checking the tailgate includes:
a) operating the latch actuator to over-stroke the latch, wherein over-stroking the latch includes moving the latch in the latching direction from the full-latching position to an over-stroking position;
b) identifying an over-stroking load on the latch actuator, the over-stroking load on the latch actuator associated with its operation to over-stroke the latch; and
c) based on the over-stroking load on the latch actuator, determining whether the tailgate is overloaded or not overloaded.

8. The method of claim 7, wherein over-stroking the latch includes moving the latch in the unlatching direction from the over-stroking position to the full-latching position.

9. The method of claim 7, wherein:
identifying the over-stroking load on the latch actuator includes:
identifying an over-stroking electrical energy drawn by the latch actuator, the over-stroking electrical energy drawn by the latch actuator associated with its operation to over-stroke the latch; and
determining whether the tailgate is overloaded or not overloaded includes:
comparing the over-stroking electrical energy drawn by the latch actuator to a threshold;
determining that the tailgate is overloaded when the over-stroking electrical energy drawn by the latch actuator meets the threshold; and
determining that the tailgate is not overloaded when the over-stroking electrical energy drawn by the latch actuator does not meet the threshold.

10. The method of claim 9, wherein the over-stroking electrical energy drawn by the latch actuator is associated with its operation to move the latch in the latching direction from the full-latching position to the over-stroking position, and is an electrical energy drawn by the latch actuator during a predetermined time following the start of its operation to move the latch in the latching direction from the full-latching position to the over-stroking position.

11. The method of claim 7, further comprising:
when the tailgate is overloaded:
operating the latch actuator to disengage the latch without deactivating the latch for movement in the unlatching direction.

12. The method of claim 7, further comprising:
when the tailgate is overloaded:
operating a user interface to issue an alert that the tailgate is overloaded.

13. The method of claim 7, further comprising:
when the tailgate is not overloaded:
operating the latch actuator to deactivate the latch for movement in the unlatching direction; and
operating a tailgate actuator connected with the tailgate to open the tailgate.

14. The method of claim 7, further comprising:
identifying whether the request to automatically open the tailgate is remotely generated or non-remotely generated;
when the request to automatically open the tailgate is remotely generated:
overload checking the tailgate; and
when the tailgate is not overloaded:
operating the latch actuator to deactivate the latch for movement in the unlatching direction; and
operating a tailgate actuator connected with the tailgate to open the tailgate; and
when the request to automatically open the tailgate is non-remotely generated:

operating the latch actuator to deactivate the latch for movement in the unlatching direction.

15. A non-transitory computer-readable medium for operating a power tailgate system, the non-transitory computer-readable medium including instructions that when executed by one or more processors cause the one or more processors to:
- identify a user input-based request to automatically open a tailgate when the tailgate is latched by a latch movable in a latching direction and in an unlatching direction, and connected with a latch actuator operable to disengage the latch, move the latch in the latching direction, and move the latch in the unlatching direction, and when the latch is in a full-latching position, activated by the latch actuator for non-revertible movement in the latching direction, whereby the latch is not movable in the unlatching direction past the full-latching position, and subject to deactivation by the latch actuator for movement in the unlatching direction, whereby the latch is movable in the unlatching direction; and
- overload check the tailgate in response to the request to automatically open the tailgate, wherein overload checking the tailgate includes:
  a) operating the latch actuator to over-stroke the latch, wherein over-stroking the latch includes moving the latch in the latching direction from the full-latching position to an over-stroking position;
  b) identifying an over-stroking load on the latch actuator, the over-stroking load on the latch actuator associated with its operation to over-stroke the latch; and
  c) based on the over-stroking load on the latch actuator, determining whether the tailgate is overloaded or not overloaded.

16. The non-transitory computer-readable medium of claim 15, wherein over-stroking the latch includes moving the latch in the unlatching direction from the over-stroking position to the full-latching position.

17. The non-transitory computer-readable medium of claim 15, wherein:
- identifying the over-stroking load on the latch actuator includes:
  identifying an over-stroking electrical energy drawn by the latch actuator, the over-stroking electrical energy drawn by the latch actuator associated with its operation to over-stroke the latch; and
- determining whether the tailgate is overloaded or not overloaded includes:
  comparing the over-stroking electrical energy drawn by the latch actuator to a threshold;
  determining that the tailgate is overloaded when the over-stroking electrical energy drawn by the latch actuator meets the threshold; and
  determining that the tailgate is not overloaded when the over-stroking electrical energy drawn by the latch actuator does not meet the threshold.

18. The non-transitory computer-readable medium of claim 17, wherein the over-stroking electrical energy drawn by the latch actuator is associated with its operation to move the latch in the latching direction from the full-latching position to the over-stroking position, and is an electrical energy drawn by the latch actuator during a predetermined time following the start of its operation to move the latch in the latching direction from the full-latching position to the over-stroking position.

19. The non-transitory computer-readable medium of claim 15, further including instructions that when executed by one or more processors cause the one or more processors to:
- when the tailgate is overloaded:
  operate the latch actuator to disengage the latch without deactivating the latch for movement in the unlatching direction; and
  operate a user interface to issue an alert that the tailgate is overloaded.

20. The non-transitory computer-readable medium of claim 15, further including instructions that when executed by one or more processors cause the one or more processors to:
- identify whether the request to automatically open the tailgate is remotely generated or non-remotely generated;
- when the request to automatically open the tailgate is remotely generated:
  overload check the tailgate; and
  when the tailgate is not overloaded:
    operate the latch actuator to deactivate the latch for movement in the unlatching direction; and
    operate a tailgate actuator connected with the tailgate to open the tailgate; and
- when the request to automatically open the tailgate is non-remotely generated:
  operate the latch actuator to deactivate the latch for movement in the unlatching direction.

* * * * *